Patented July 8, 1924.

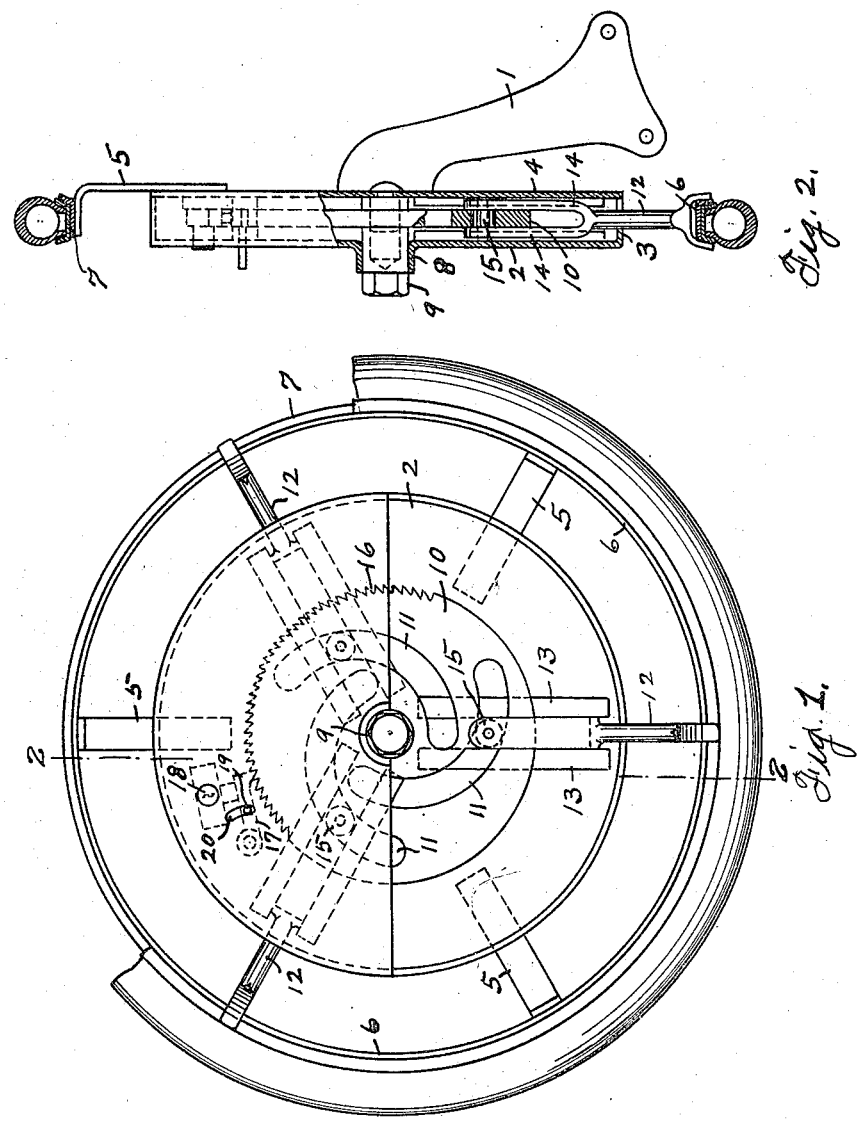

1,500,460

UNITED STATES PATENT OFFICE.

CHRISTIAN H. LARSON, OF GUFFEY, TEXAS, ASSIGNOR OF ONE-FOURTH TO H. A. McDONALD, ONE-FOURTH TO J. L. YOUNG, AND ONE-FOURTH TO H. P. PHILLIPS, ALL OF JEFFERSON COUNTY, TEXAS.

TIRE RACK.

Application filed May 7, 1921. Serial No. 467,646.

*To all whom it may concern:*

Be it known that I, CHRISTIAN H. LARSON, a citizen of the United States, residing at Guffey, in the county of Jefferson and State of Texas, have invented certain new and useful Improvements in a Tire Rack, of which the following is a specification.

This invention relates to new and useful improvements in a tire rack.

One object of the invention is to provide a tire rack, adapted to be secured to a vehicle and provided to carry an extra, or spare, tire.

Another object is to provide a rack whereon the tire can be securely locked to secure the same against theft or unauthorized removal, said rack also embodying means for the ready release of the tire when it is desired to remove the same.

With the above and other objects in view this invention has particular relation to certain novel features of construction, operation and arrangement of parts, an example of which is given in this specification and illustrated in the accompanying drawings, wherein:—

Figure 1 shows a side view of the device, and

Figure 2 shows a sectional view, taken on the line 2—2 of Figure 1.

Referring now more particularly to the drawings, the numeral 1 designates a bracket carried by the rear end of the vehicle and by which the rack is carried. The numeral 2 designates the rear end plate which has the overturned marginal flange 3, on which the front end plate 4 rests. This end plate 4 is attached to the supporting bracket 1 and it carries the radiating supporting arms 5, to the outer ends of which the supporting rim 6 is attached.

The numeral 7 designates the tire rim on which the tire, to be carried, is mounted. The tire rim when mounted surrounds the supporting rim 6. The rear end plate has a central bearing 8 in which a stub shaft 9 is rotatably mounted. The outer end of this shaft is formed to receive a wrench, and fixed on its inner end there is a disc 10, which has the cam shaped slots 11 therethrough, forming bearings. Radially movable rods 12 work through suitable bearings in the flange 3. The inner ends of these rods slide in the guideways 13 formed on the inner sides of the end plates, and said ends of said rods are bifurcated forming the fingers 14 which embrace the disc 10. Mounted between these fingers, and working in the corresponding slots 11, are the rollers 15. The outer ends of the rods are also bifurcated, and formed to clamp around the supporting rim and engage on each side of the tire rim thereon. A section of the disc 10 is serrated, forming the teeth 16 and a dog 17 is pivoted in the casing and disposed to engage with said teeth to prevent the backward turning of said disc. This dog may be locked in engaging position by means of a suitable lock 18. When the lock is released the dog may also be released from the disc and said disc rotated backwardly.

When the stub shaft is turned in the appropriate direction, the slots 11 will operate through the rollers 15 to draw the rods 12 inwardly and their outer ends will be disengaged from the tire rim and the tire may be demounted. When said shaft is turned in the other direction it will actuate said rods outwardly and into locking engagement with the tire rim, when mounted. The dog 17 may then be engaged with the teeth 16 of the disc 10 and locked in said position and the tire cannot then be removed. This dog is manipulated through a pin 19 which works through a slot 20 in the rear end plate 2.

What I claim is:—

A device of the character described, including a casing, a rim support carried thereby and provided to receive a tire rim, radially movable members, the inner ends of which are bifurcated, a roller carried by the inner end of said bifurcations and within the casing, and whose outer ends have notches to receive the support and rim and lock them together when said members are extended, a rotary member within the casing having a portion of its edge serrated, and operatively connected with said movable members and by the rotation of which the movable members may be radially moved into extended or withdrawn position, said rotary member embodying cams which actuate said movable members, and means for locking said rotary member to hold said radially movable members in extended position.

In testimony whereof I have signed my name to this specification in the presence of two subscribing witnesses.

CHRISTIAN H. LARSON.

Witnesses:
E. V. HARDWAY,
ABORS KOEFORD.